US008140478B2

(12) United States Patent
Wolman et al.

(10) Patent No.: US 8,140,478 B2
(45) Date of Patent: Mar. 20, 2012

(54) COMMIT RATE MANAGEMENT WITH DECOUPLED COMMIT OPERATIONS

(75) Inventors: Alastair Wolman, Seattle, WA (US);
John Dunagan, Bellevue, WA (US);
John Carleton McCullough, San Diego, CA (US); Bruce W. Copeland, Redmond, WA (US); Jeremy L. Dewey, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 520 days.

(21) Appl. No.: 12/362,169

(22) Filed: Jan. 29, 2009

(65) Prior Publication Data

US 2010/0191712 A1 Jul. 29, 2010

(51) Int. Cl.
*G06F 7/00* (2006.01)
*G06F 17/30* (2006.01)
(52) U.S. Cl. ...................................................... 707/643
(58) Field of Classification Search .................... None
See application file for complete search history.

(56) References Cited

U.S. PATENT DOCUMENTS

| 6,496,871 | B1 | 12/2002 | Jagannathan et al. | |
|---|---|---|---|---|
| 6,817,018 | B1* | 11/2004 | Clarke et al. .................. | 719/313 |
| 6,859,821 | B1 | 2/2005 | Ozzie et al. | |
| 6,999,956 | B2 | 2/2006 | Mullins | |
| 7,340,502 | B2 | 3/2008 | Richardson et al. | |
| 2007/0169055 | A1 | 7/2007 | Greifeneder | |

FOREIGN PATENT DOCUMENTS

EP 0926608 B1 6/1999

OTHER PUBLICATIONS

Ou et al., "Tick Scheduling: A Deadline Based Optimal Task Scheduling Approach for Real-Time Data Stream Systems", WAIM 2005, LNCS 3739, pp. 725-730, 2005, Springer-Verlag Berlin Heidelberg.*
Graefe, "B-Tree indexes for high update rates", SIGMOD Record, vol. 35, No. 1, pp. 39-44, Mar. 2006, ACM.*
Baek, et al."The OpenTM Transactional Application Programming Interface", Retrieved at<<http://tcc.stanford.edu/publications/tcc_pact,2007_talk.ppt>>, 2007, pp. 27.
Stout, et al."Parallel Computing 101", Retrieved at<<http://resa.ipsl.jussieu.fr/mafoipsl/SUPPORT_COURS/SC2005/S02_Parallel_Computing/S02.SC05complete.pdf>>, 2005, pp. 372.
Thomas Dave, "Enabling Application Agility—Software as a Service, Cloud Computing and Dynamic Languages", Retrieved at<<http://www.jot.fm/issues/issue_2008_05/column3.pdf>>, Published by ETH Zurich, Chair of Software Engineering, vol. 7, No. 4, May-Jun. 2008, pp. 4.

(Continued)

Primary Examiner — Michael Hicks

(57) ABSTRACT

Consistency is managed among data operations by coalescing commit operations, adjusting a commit rate to optimize latency, and converging to fairness across servers. Write operations representing a change to data stored by one or more of a plurality of computing devices are received in succession by, for example, a cloud computing service. A state of a plurality of tracking objects is adjusted to indicate whether the change in data has been provided to the computing devices and whether the change in data has been acknowledged by the computing devices. Changes to the same data are coalesced such that only the most recent change is provided to the computing devices for storage. In some embodiments, the commit rate is adjustable such that the commit rate decreases quickly but increases slowly based on measured latencies.

20 Claims, 9 Drawing Sheets

OTHER PUBLICATIONS

Khalidi, et al. "PDC2008—Architecting Services for Windows Azure", Retrieved at<<http://blogs.msdn.com/cloudcomputing/archive/2008/10/29/pdc2008-architecturing-services-for-windows-azure.aspx>>, Nov. 24, 2008, pp. 5.

Lowell and Chen, "Persistent Messages in Local Transactions", 17th ACM Symposium on Principles of Distributed Computing, Jun. 2008, pp. 8.

Elnozahy and Zwaenepoel, "Manetho: Transparent Rollback-Recovery with Low Overhead, Limited Rollback and Fast Output Commit," Department of Computer Science, Rice University, Houston, TX, 1992, pp. 19.

Nightingale, Edmund, et al., "Rethink the Sync," Department of Electrical Engineering and Computer Science, University of Michigan, ISDU'06: 7th USENIX Symposium on Operating Systems Design and Implementation, 2006, pp. 14.

Stevens, W., "RFC2001-TCP Slow Start, Congestion Avoidance, Fast Retransmit," Retrieved at << http://www.faqs.org/rfcs/rfc2001.html>>, Jan. 1997, pp. 5.

* cited by examiner

COMMIT RATE MANAGEMENT WITH DECOUPLED COMMIT OPERATIONS

BACKGROUND

Typical cloud computing systems include front-end servers, middle tier servers, and backend storage servers. Some existing services focus on addressing partitioning and recovery between the front-end servers and the middle tier servers. Other services are developed for execution by the middle tier servers. To maintain consistency among data operations, application developers implement logic for execution at the backend storage servers (e.g., as structured query language instructions). Such logic, however, is difficult to program and separates implementation of the existing services across both the backend storage servers and the middle tier servers. For example, application program developers create logic for assigning requests to the middle tier servers, providing consistency semantics on the middle tier state, communicating with the backend storage servers, and calling any stored procedures at the backend storage servers appropriately.

SUMMARY

Embodiments of the invention decouple commit operations from write operations to provide consistency and optimized latency. A plurality of tracking objects representing commit operations to be performed by one or more computing devices are accessed. A commit rate for the commit operations is defined. The accessed plurality of tracking objects are provided to the computing devices at the commit rate, and a latency associated with the commit operations is measured. The measured latency is compared to the defined commit rate. The defined commit rate is adjusted based on the comparison and based on a factor determined relative to the defined commit rate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure provide, at least, strong consistency including a formalization of semantics provided by data and operations in a distributed system such as a cloud service or other cloud computing system. Further, the disclosure provides a programming model for building consistent application logic within the cloud service to allow opportunities for optimizing access to storage systems. Use of a generic scale-out store is optimized with a dynamic control loop for low latency subject to fairness. The dynamic control loop is based on, for example, latency rather than explicit feedback from the cloud service. In some embodiments, the disclosure is operable with any generic scale-out store that supports at least basic Put( ) and Get( ) operations.

While described in the context of the cloud service in some embodiments, the disclosure is applicable in embodiments other than the cloud service. For example, the disclosure is applicable in embodiments in which a single computing device performs read and write operations on a memory area.

Figure 1:
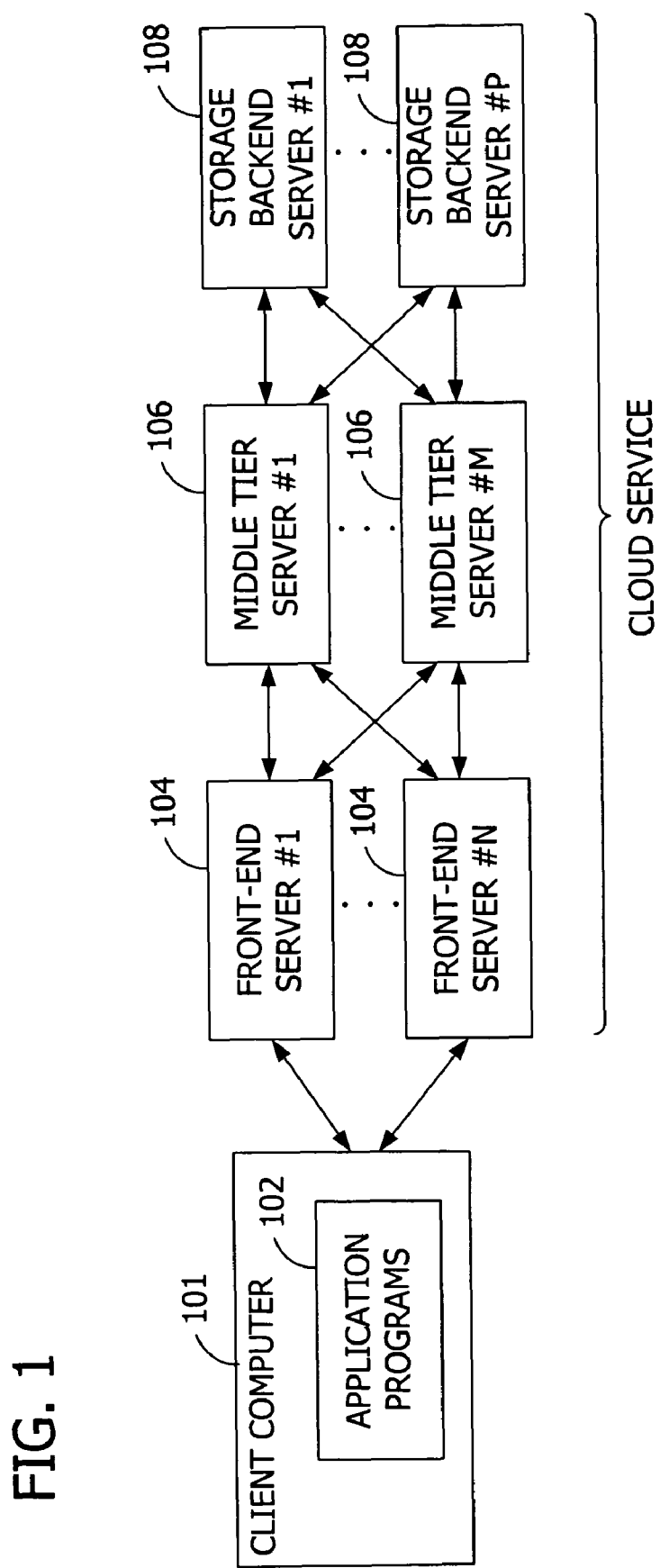
FIG. 1 is an exemplary block diagram illustrating a typical configuration of a cloud service providing computing capabilities.

Referring again to FIG. 1, an exemplary block diagram illustrates a typical configuration of a cloud service providing computing capabilities. One or more application programs 102 executing on a client computer 101 provide operations and data to the cloud service. The cloud service represents any service that receives requests (e.g., from the application programs 102), performs operations, and responds to the requests. The exemplary cloud service in FIG. 1 includes three tiers: one or more front-end servers 104 such as front-end server #1 through front-end server #N, one or more middle tier servers 106 such as middle tier server #1 through middle tier server #M, and one or more storage backend servers 108 such as storage backend server #1 through storage backend server #P. The front-end servers 104 perform lightweight tasks such as user authentication and communication with users and the application programs 102. The front-end servers 104 query the middle tier servers 106 for heavyweight operations. The middle tier servers 106 execute the bulk of the functionality of the cloud service. The storage backend servers 108 are responsible for data storage and other related operations.

Figure 2:
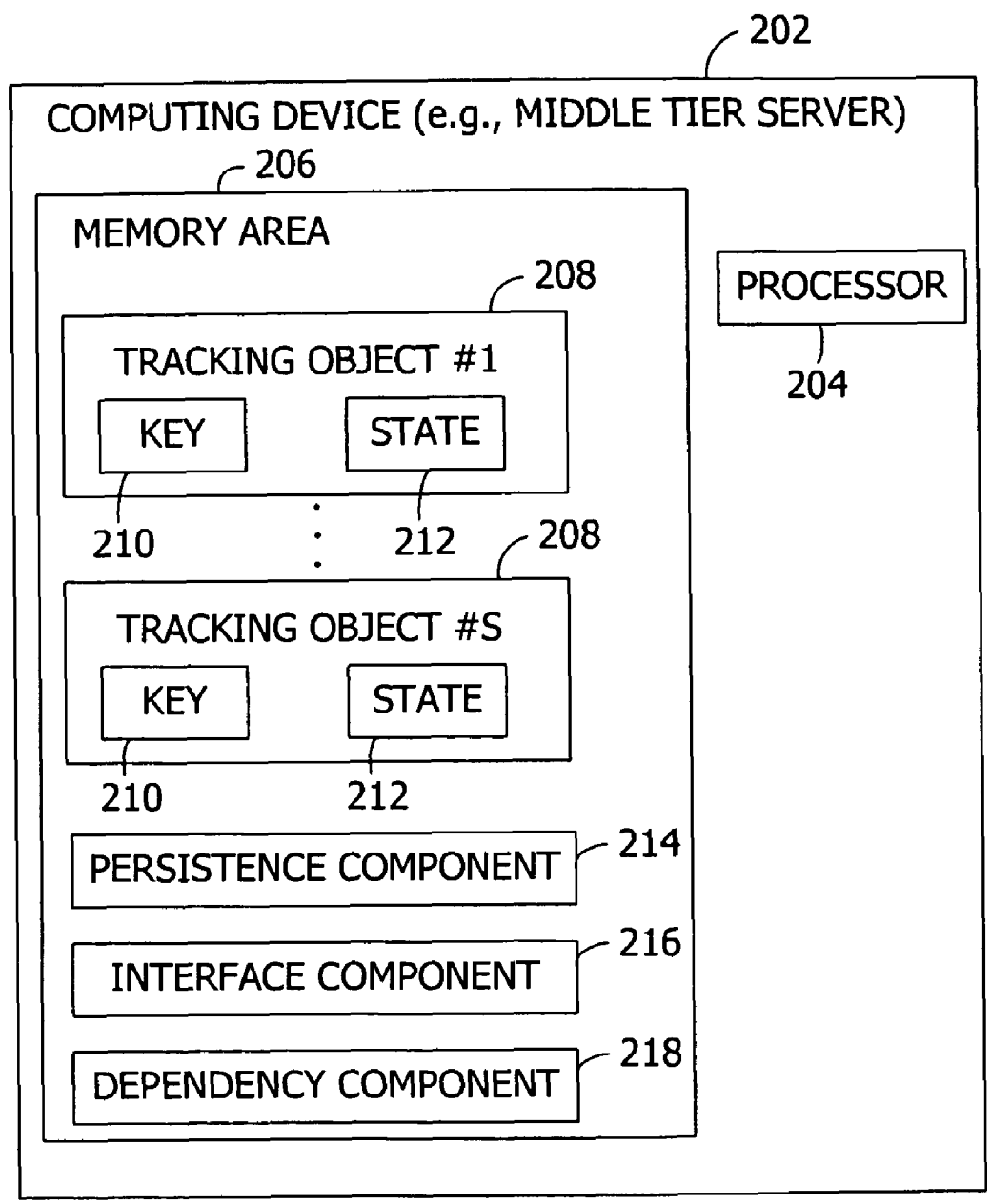
FIG. 2 is an exemplary block diagram illustrating a computing device for processing tracking objects representing changes to data.

Referring next to FIG. 2, an exemplary block diagram illustrates a computing device 202 for processing tracking objects 208 representing changes to data. The computing device 202 is, for example, part of the middle tier servers 106 and manages dependencies among data operations in the cloud service by, in part, decoupling commit operations from write operations. In some embodiments, the instructions and components stored in a memory area 206 are implemented as one or more libraries that are linked in by all the middle tier servers 106. Communication with the storage backend servers 108 is performed via application programming interfaces (APIs) included in the linked libraries. The logic executed by the computing device 202 represents a scale-out soft state middle tier that uses a hard-state scale-out backend to implement persistence.

The computing device 202 includes a processor 204 and the memory area 206. The processor 204 is programmed to execute computer-executable instructions for implementing aspects of the disclosure. In some embodiments, the processor 204 is programmed to execute instructions such as those illustrated in the figures (e.g., FIG. 8).

The memory area 206, or other computer-readable media, stores one or more tracking objects 208 such as tracking object #1 through tracking object #S. The tracking objects 208 track read or write operations. In some embodiments, one or more of the tracking objects 208 stored in the memory area 206 correspond to one or more write operations to effect changes in data stored by a computing device 202 such as any of the storage backend servers 108. In general, the tracking objects 208 have a one-to-many relationship with read and write actions. Each of the tracking objects 208 has a key 210 and a state 212. The key 210 identifies the tracking object 208, while the state 212 indicates whether the change in data has been provided to the storage backend servers 108 and whether the change in data has been acknowledged by the storage backend servers 108.

In some embodiments, there is a single owner of each key 210. For example, the presence data for a single messaging user may be stored under a single partition key (e.g., the electronic mail address of the user). Aspects of the disclosure provide consistency at the granularity of the key 210 and commit data at either the key 210 or sub-key level (e.g., for each field within the presence data to reduce commit overhead).

The state 212 of each of the tracking objects 208 may be implemented as, for example, two bits and a queue of callbacks. The two bits include a dirty bit and an outstanding bit. The queue of callbacks is specified by the application in the middle-tier 106 that is using memory area 206. In some embodiments, the callbacks correspond to sending messages that reflect the successful completion of the operation. The "dirty=true" value means there are changes that have not yet been sent to the storage backend servers 108. The "outstanding=true" value means there are changes that have been sent to the storage backend servers 108 but not yet acknowledged. It is safe to execute a callback immediately if "dirty=false" and "outstanding=false". If "dirty=false" but "outstanding=true", the callback is added to a first-in-first-out (FIFO) queue of callbacks to execute when the commit returns from the storage backend servers 108. If "dirty=true" and regardless of what the outstanding bit is, the callback is added to a FIFO queue that is waiting on serialization of this dirty object. After the dirty object is serialized and sent to the storage backend servers 108, the entire queue of callbacks associated with that object waits on the commit returning from the storage backend servers 108. This logic handles both callbacks associated with a read and callbacks associated with a write. The write caused the object to be marked dirty before the callback was enqueued.

The memory area 206 further stores one or more computer-executable components. The components include, for example, a persistence component 214, an interface component 216, and a dependency component 218. These components are described below with reference to FIG. 3.

In the example of FIG. 2, the memory area 206 is within the computing device 202. However, the memory area 206 or any of the data stored thereon may be associated with any server or other computer, local or remote from the computing device 202 (e.g., accessible via a network).

Figure 3:
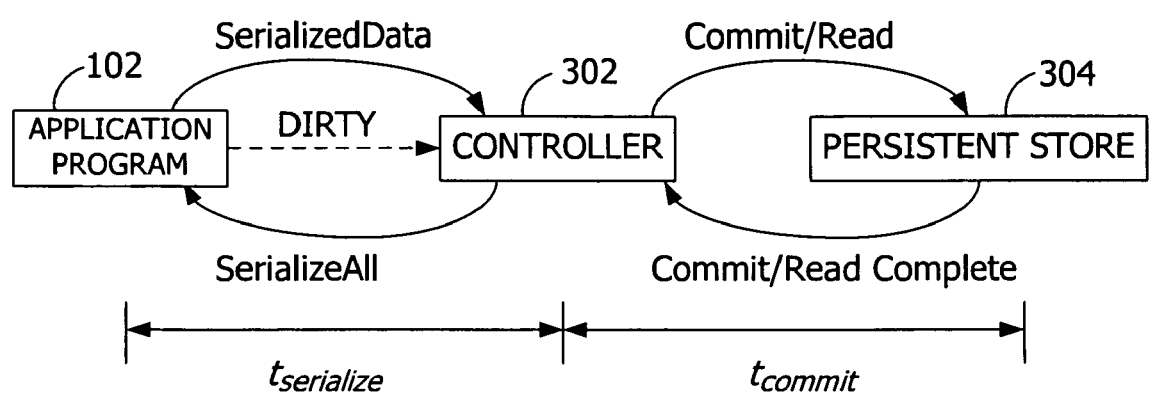
FIG. 3 is an exemplary block diagram illustrating the serialization and commitment of data operations.

Referring next to FIG. 3, an exemplary block diagram illustrates the serialization and commitment of data operations. A controller 302 requests that the application program 102 serialize the data operations. The controller 302 algorithmically determines when to make these requests so as to reduce messaging overhead to the persistent store 304. In an example, the controller 302 includes logic executing on one or more of the middle tier servers 106. The application program 102 serializes the data operations and provides the serialized data operations in, for example, a single communication to the controller 302.

The controller 302 marks the serialized data operations as dirty, deleted, or otherwise changed. The time $t_{serial}$ represents the time for serialization. The controller 302 provides the data operations (e.g., commit or read operations) to a persistent store 304 (e.g., one or more of the storage backend servers 108). The persistent store 304 performs the data operations and provides an acknowledgement to the controller 302. The time $t_{commit}$ represents the time for reads and writes to the persistent store 304.

Exemplary interfaces for processing read and write operations are included in Appendix A.

In an embodiment, the persistence component 214, the interface component 216, and the dependency component 218 execute as part of the controller 302. The persistence component 214 manages a commit rate for the commit operations based in part on the performance of the commit operations. The interface component 216 (e.g., a storage proxy) accesses a plurality of the tracking objects 208 (e.g., received in succession from the application programs 102 in some embodiments). The dependency component 218 alters, responsive to the accessing by the interface component 216, the state 212 of the tracking objects 208 to indicate that the change in data has not been provided to the persistent store 304. For example, the received tracking objects 208 are marked as dirty. The dependency component 218 further combines or coalesces the operations tracked by the tracking objects 208 corresponding to the same data such that the dependency component 218 provides the change in data from only the last received of the combined tracked operations to the persistent store 304 at the commit rate managed by the persistence component 214. Coalescing is further described below with reference to FIG. 4.

In an example in which the controller 302 executes on a plurality of the middle tier servers 106 in the cloud service, the persistence component 214 executes to adjust a commit rate of each of the middle tier servers 106 such that the commit rates of the middle tier servers 106 converge over time.

In some embodiments, the data operations are tracked by the tracking objects 208, and the controller 302 coalesces the data operations to reduce the quantity of write operations affecting the same data stored by the persistent store 304. In operation, the controller 302 receives one or more data operations that are writes from the middle-tier program (or a plurality of the middle-tier programs) in succession during a predefined interval. The controller 302 marks the tracking objects 208 as dirty by altering the state 212 of each of the tracking objects 208 to indicate that the change in data tracked by the tracking objects 208 has not been provided to the persistent store 304. The controller 302 identifies a plurality of tracked data operations as having the same key 210 (e.g., affecting the same data in the persistent store 304). The controller 302 communicates with the persistent store 304 to commit the change in data corresponding only to the data operation received last during the predefined interval. The controller 302 alters the state 212 of the tracking object 208 to indicate that the change in data has been provided to the persistent store 304. After storage, the persistent store 304 notifies the controller 302 that the change in data has been stored. The controller 302 notifies the middle-tier program corresponding to the identified tracking object 208 of the committed change by executing the callbacks that the middle-tier program had earlier specified.

Figure 4:
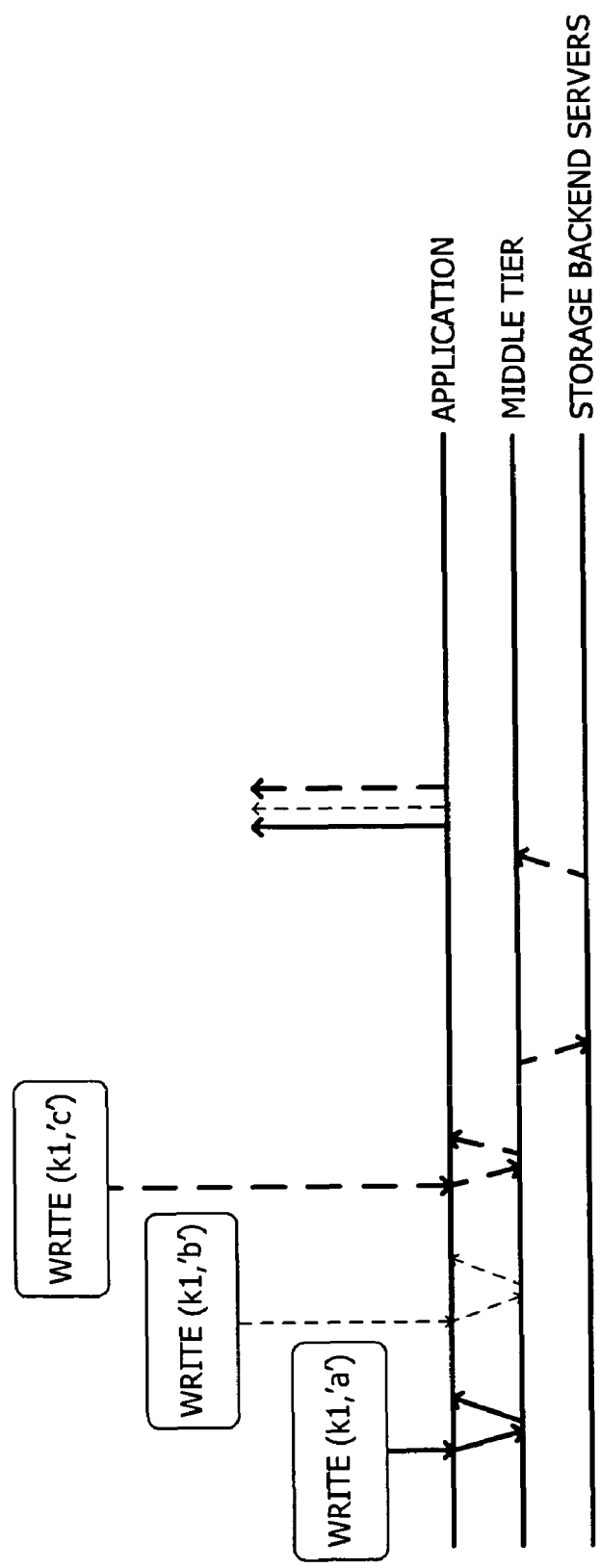
FIG. 4 is an exemplary sequence diagram illustrating the coalescing of write operations during a time interval
Figure 5:
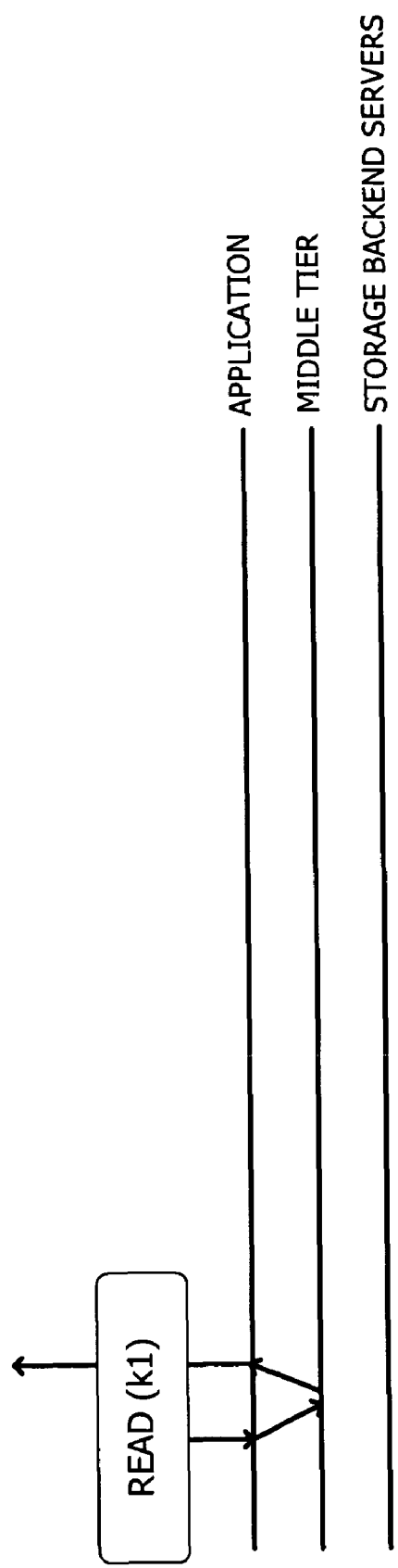
FIG. 5 is an exemplary sequence diagram illustrating performance of a read operation on data marked as clean.
Figure 6:
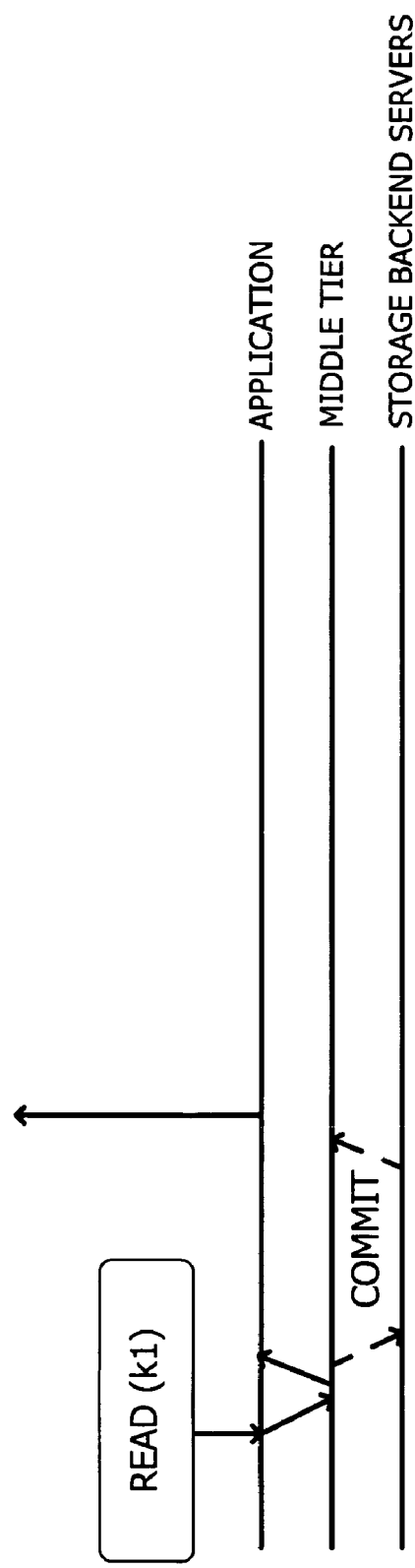
FIG. 6 is an exemplary sequence diagram illustrating performance of a read operation on data marked as dirty.
Figure 7:
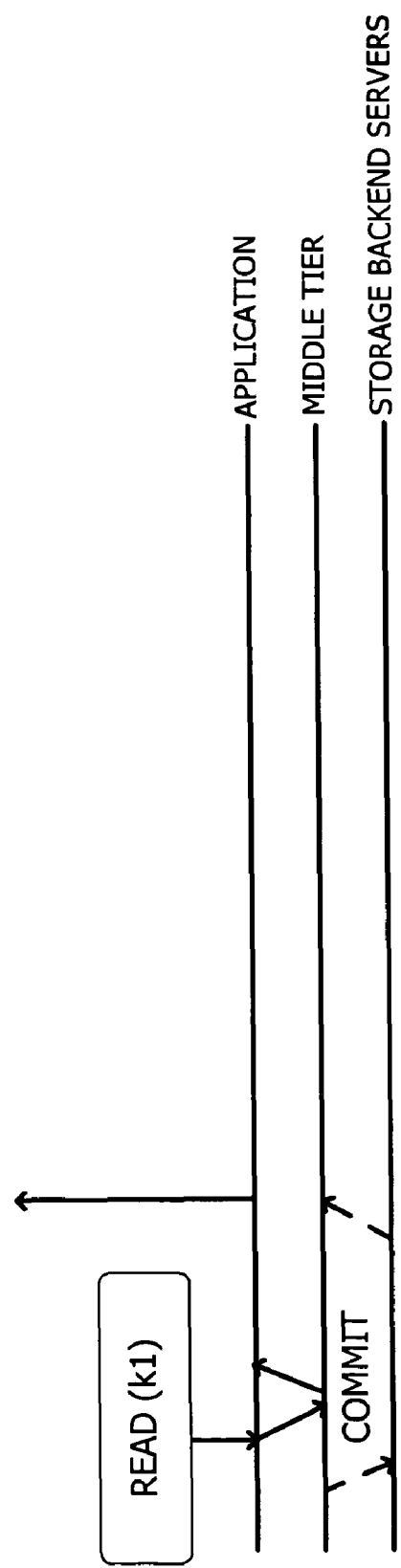
FIG. 7 is an exemplary sequence diagram illustrating performance of a read operation on data marked as clean but at least one outstanding commit operation associated therewith.

A graphical illustration of the coalescing of data operations is next shown in FIG. 4, following by illustrations of dependency management in FIG. 5, FIG. 6, and FIG. 7.

Referring next to FIG. 4, an exemplary sequence diagram illustrates the coalescing of write operations during a time interval. The data operation Write(k1,'a') first received by the middle-tier program in this example is provided to the middle tier. The middle tier marks the data associated with key k1 as dirty. Before committing the write operation (e.g., a commit interval has not elapsed yet), two additional data operations are received by the middle-tier program: Write(k1,'b') and Write(k1,'c'). The data associated with key k1 is still dirty, and there have been no commit operations since before the first write operation was received. After the commit interval has elapsed, the middle tier commits only the last received write operation for the data associated with key k1. Writing 'c' into the data block associated with key k1 is semantically equivalent to writing 'a', then 'b', and then 'c'. However, by coalescing the write operations by only writing 'c', the middle tier has reduced the quantity of the write operations performed. The storage backend servers 108 then acknowledge all three of the write operations.

The amount of coalescing and batching of data operations is adjustable by, for example, a control loop such as described below in FIG. 8. The dynamic control loop optimizes end-to-end latency to avoid overloading the storage backend servers 108 when the workload is intense, and avoids underperforming when the storage backend servers 108 are lightly loaded. For a given workload, committing less frequently results in higher coalescing and batching, but decreases the responsiveness.

Referring next to FIG. 5, an exemplary sequence diagram illustrates performance of a read operation on data marked as clean. In the example of FIG. 5, a read operation Read(k1) is received by the middle-tier program. A component within the middle-tier program confirms that the data associated with key k1 is clean with no outstanding commit operations, and executes a callback to the middle tier immediately. The middle-tier then releases the data associated with k1 to the front-end server 104.

Referring next to FIG. 6, an exemplary sequence diagram illustrates performance of a read operation on data marked as dirty. In the example of FIG. 6, a read operation Read(k1) is received by the middle-tier program. The component in the middle tier determines that the data associated with key k1 is dirty (whether or not there are outstanding commit operations) which means that a change to the data associated with k1 has been received by the middle tier but not yet provided to the storage backend servers 108. As a result, the middle tier waits for the commit operation to occur, and then provides the data associated with k1 to the front-end server 104 after the storage backend servers 108 acknowledge the commit operation.

Referring next to FIG. 7, an exemplary sequence diagram illustrates performance of a read operation on data marked as clean but at least one outstanding commit operation associated therewith. In the example of FIG. 7, a read operation Read(k1) is received by the middle-tier program. The middle tier determines that the data associated with key k1 is clean, but that there is an outstanding commit operation. The middle tier waits for acknowledgement of the commit operation from the storage backend servers 108 before releasing the data associated with k1 to the front-end server 104.

In the examples of FIG. 5, FIG. 6, and FIG. 7, there is a latency associated with the commit operations. In some embodiments, the latency is measured and used to adjust a commit rate of the middle tier servers 106, as described next with reference to FIG. 8.

Figure 8:
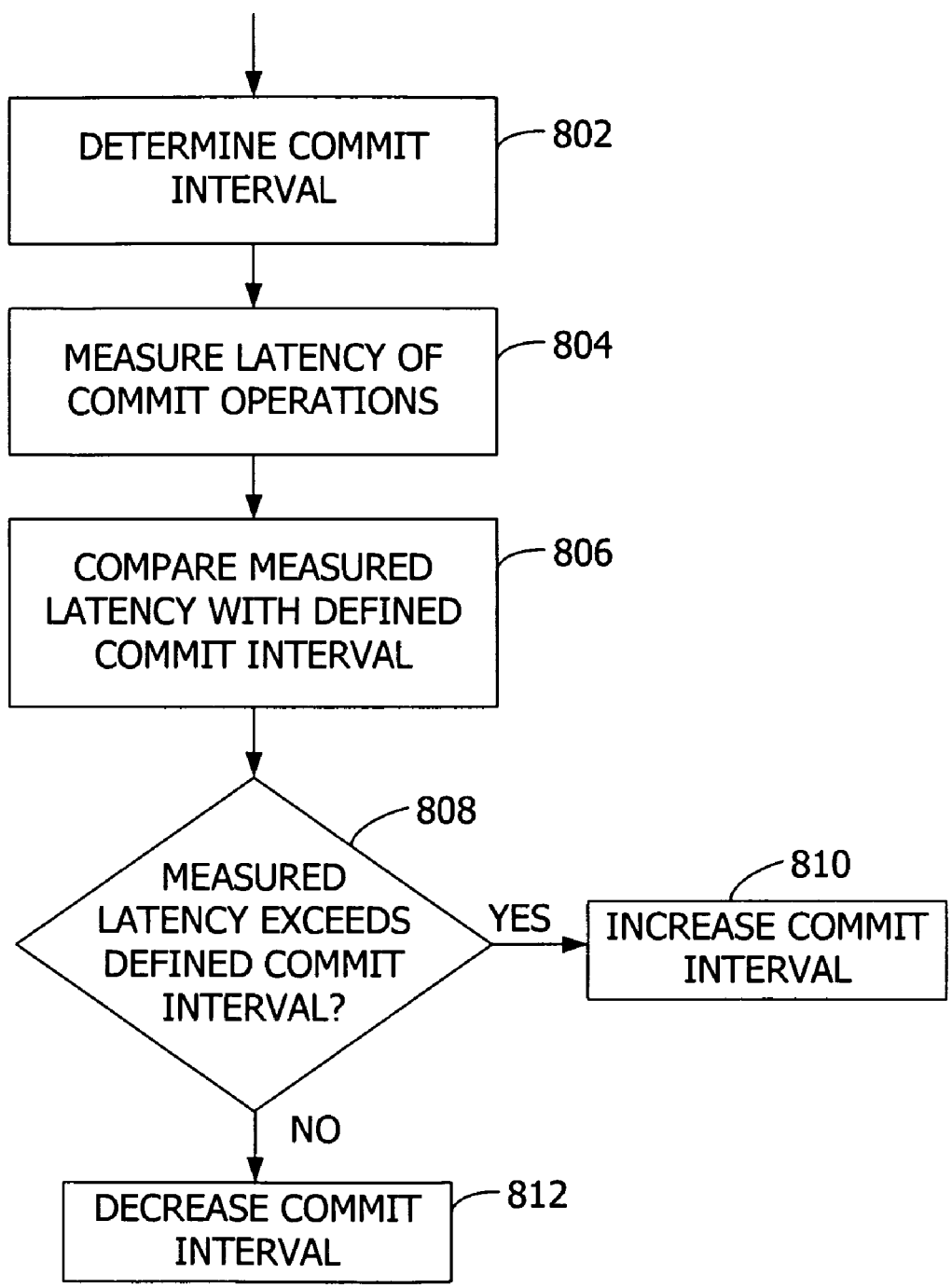
FIG. 8 is an exemplary flow chart illustrating the adjustment of a rate for a computing device to perform commit operations.

Referring next to FIG. 8, an exemplary flow chart illustrates the dynamic adjustment of a rate for the computing device 202 to perform commit operations. In some embodiments, the computing device 202 is part of the middle tier servers 106. A plurality of the tracking objects 208 are created, for example, in response to calls made by one of the middle tier servers 106. At 802, a commit interval is defined. The commit interval corresponds to a commit rate, or rate at which the middle tier server 106 commits the data operations to the storage backend servers 108. The available items are committed at each interval. The data operations are sent by the middle tier server 106 to the storage backend servers 108 in accordance with the commit rate. At 804, a latency associated with performance of the commit operations is measured. For example, the latency may be associated with the mean or median of the measured latencies of a plurality of commit operations. The latency is used as an indirect measurement of load. Generally, the measured latency may reflect the size of the request, network congestion, application queuing, and actual execution latency. In some embodiments, the latency includes the time spent providing the data operations to the storage backend servers 108 and the time spent waiting for an acknowledgement from the storage backend servers 108 of the commit operations. In an example, the interval for measuring latency is proportional to a recently measured latency.

At 806, the measured latency is compared with the defined commit interval. The commit rate or interval is adjusted at 808, 810, and 812 responsive to the comparison at 806. If the measured latency exceeds the defined commit interval at 808, the commit interval is increased at 810. If the measured latency does not exceed the defined commit interval at 808, the commit interval is decreased at 812.

The commit interval is adjusted by a factor relative to the existing commit interval. Aspects of the disclosure optimize response time by slowly increasing the commit rate when appropriate to stay within an optimized range or state longer, while decreasing the commit rate quickly but not drastically to move back within the optimized range or state. This self-tuning of the commit rate accommodates for possibly large queues of work sitting at the storage backend servers 108.

Furthermore, to provide fairness among the multiple servers 106, if one of the middle tier servers 106 measures an increase in response time and the logic in FIG. 8 indicates that the commit interval be increased, and the middle tier had previously measured a slow response time, the commit interval is increased by an amount smaller than if the middle tier server 106 had previously measured a fast response time. Similarly, if the one of the middle tier servers 106 measures a decrease in response time and the logic in FIG. 8 indicates that the commit interval be decreased, and the middle tier had previously measured a slow response time, the commit interval is decreased by an amount greater than if the middle tier server 106 had previously measured a fast response time.

As an example, if given a maximum latency (or commit interval) and a minimum latency (or commit interval), the factor is determined based on the maximum latency, the minimum latency, and the existing commit interval such as shown below in Equation (1).

$$\text{factor} = 1 + \text{ratio} * (\text{maximumLatency} - \text{commitInterval}) / (\text{maximumLatency} - \text{minimumLatency}) \quad (1)$$

The ratio represents a default factor for adjusting the commit interval.

Figure 9:
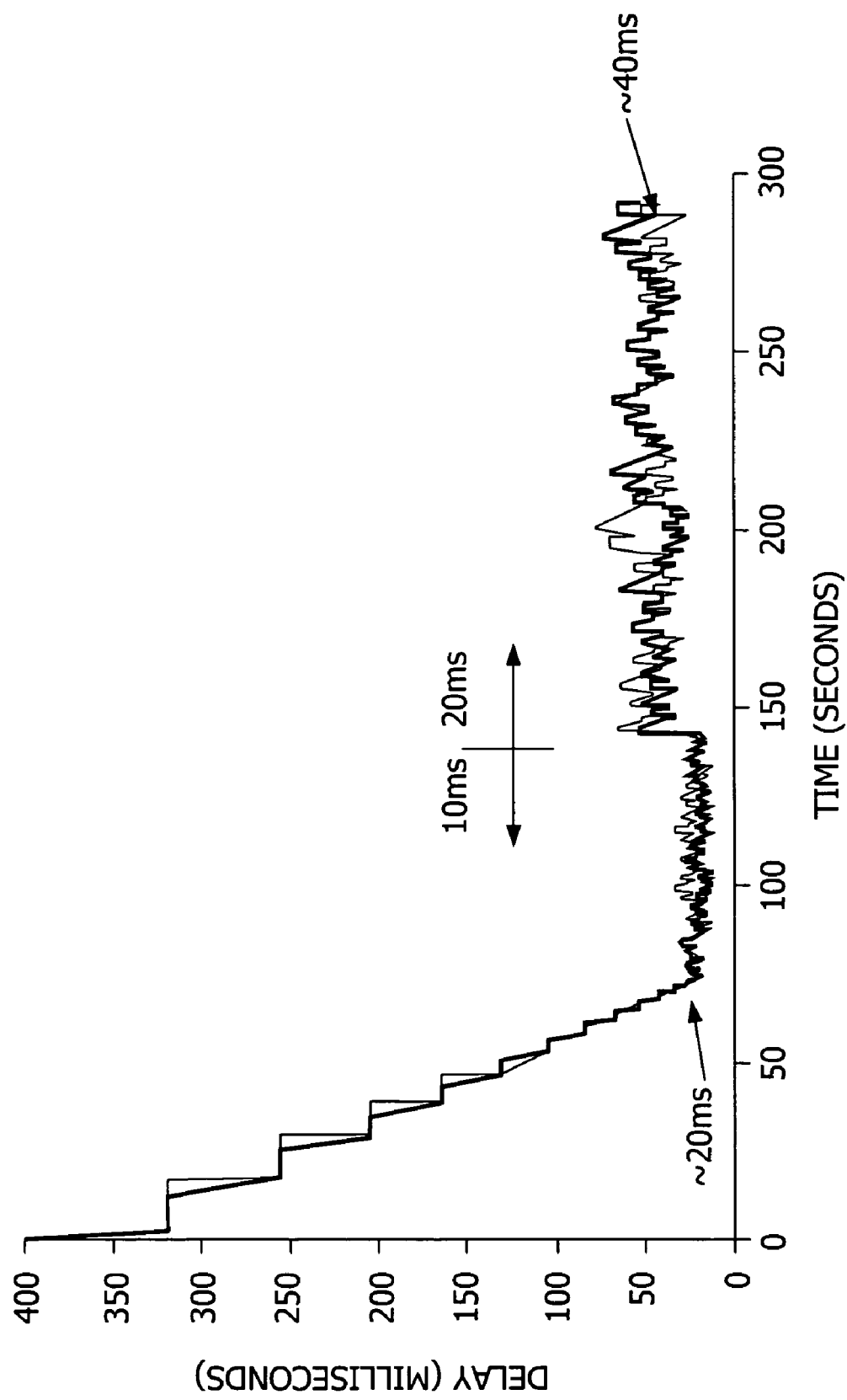
FIG. 9 is an exemplary graph illustrating rate convergence for commit operations performed by two computing devices.

Referring next to FIG. 9, an exemplary graph illustrates rate convergence for commit operations performed by two computing devices. In a cloud computing embodiment, the two computing devices represent middle tier servers 106 and execute the logic illustrated in FIG. 8. The vertical axis shows delay in milliseconds and the horizontal axis shows elapsed time in seconds. In the example of FIG. 9, the service time (e.g., latency) changes from 10 milliseconds to 20 milliseconds at 150 seconds, and read or write requests are generated every two milliseconds. In an embodiment, the optimal delay equals the quantity of middle tier servers 106 times the service time. The two lines in the graph illustrate the convergence of the delay of the two middle tier servers 106 over time. The convergence of the delay represented by the two lines shows that the workload is being balanced between the two middle tier servers 106 which provides consistent responsiveness from the middle tier.

EXAMPLES

Exemplary logic for execution by the application programs 102 calling interfaces of the disclosure is shown below.

```
// Application executes some pattern of operations that modify
// the key and calls the following:
// The item and lock parameters are simply passed back to the
// application on serialization requests
midtierAPI.MarkDirty(ownershipHandle, sub-key, subDirtyItem,
subLockObj);
...
midtierAPI.ReleaseWhenPersisted(dependencyHandle, { /* Callback */ });
...
// Some time Later, the middle tier API will execute the //
App.SerializeAll callback
App.SerializeAll(serializationHandle);
// Exemplary code in the App.SerializeAll callback is:
List<CommitData> dirty = midtierAPI.GetKeysToSerialize( );
List<CommitData> deleted = midtierAPI.GetKeysDeleted( );
foreach (CommitData item in dirty)
{
Dict<sub-key, info> = midtierAPI.GetSubKeysToSerialize(item);
// Do serialization, store data in data dict.
}
// Pass the data back to the middle tier
midtierAPI.SubKeysSerialized(serializationHandle, data, deleted, failed);
// For the duration of this call, no modification to the keys
// referenced in the data, deleted, or failed structures is made.
// More specifically, if data is partitioned, it is alright to
// only process a subset of GetKeysToSerialize, but the point
// from the first serialization through the call to
// SubKeysSerialized is exclusive to modifications on those
// serialized keys (because the Dirty bits are cleared when the
// call is processed).
```

Exemplary logic for the application programs 102 to demand load state to the middle tier from the backend is shown below.

```
req = receiveRequest( )
key = req.Key;
midtierAPI.ExecuteWhenInitialized(key, {App.EnqueueWork(req);});
// Asynchronously
// If Object initialized execute callback
// Else
// the Middle Tier Performs Read, Calls
// App.FillKeys(key, Dictionary<sub-key, byte[ ]>)
// Expects call to KeyFilled(key) on completion
// The middle tier then executes queued callbacks in order.
```

Exemplary pseudo code and examples of the control flow of the persistence component 214 is shown in Appendix B.

Exemplary Operating Environment

While aspects of the invention are described with reference to the computing device 202, embodiments of the invention are operable with any computing device. For example, aspects of the invention are operable with devices such as laptop computers, gaming consoles (including handheld gaming consoles), hand-held or vehicle-mounted navigation devices, portable music players, a personal digital assistant, an information appliance, a personal communicator, a hand-held television, or any other type of electronic device.

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for managing dependencies among data operations at a middle tier in a cloud service, and exemplary means for optimizing a latency of commit operations for the tracking objects 208 by adjusting a commit rate differentially.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Listed below is an exemplary interface for processing a write operation.

```
key, req = ReceiveRequest( );
checkOwnership(key);
lock(key) {
    res = WriteOperation(key, req);
    checkContinuousOwner(key);
    markDirtyDataAssociatedWith(key);
}
DoWhenSafe(key, {
    SendResponse(res);
} );
```

Listed below is an exemplary interface for processing a read operation.

```
key, req = ReceiveRequest( );
checkOwnership(key);
lock(req.key) {
    res = ReadOperation(key, req);
    checkContinuousOwner(key);
}
DoWhenSafe(key, {
    SendResponse(res);
} );
```

APPENDIX B

Listed below is exemplary pseudo code for the control flow in the persistence component 214.

Initialize hysteresis, serviceLatencyFrac, increaseRatio, decreaseRatio, ceiling, floor, unhappinessThreshold, minSampleCount.

//These do not change in some embodiments of the algorithm.

Initialize commitInterval, ti and tbest to be ceiling.

//At the beginning of every measurement interval, there may be new values for commitInterval, ti and tbest.

The first measurement interval begins immediately, and lasts for serviceLatencyFrac* tbest seconds. Each subsequent measurement interval also lasts for serviceLatencyFrac* tbest seconds, and since tbest changes over time, the measurement intervals may themselves change in duration. The measurement interval is extended if less then minSampleCount requests complete, even if the time has expired. This ensures that the average is over a reasonable number of sample points.

At the end of each measurement interval, update ti to be the average latency of requests to the store that completed during this measurement interval.

```
If (ti > 1.3*tbest), go to the UNHAPPY case below.
If (hysteresis*tbest) has elapsed since being HAPPY or UNHAPPY, go
to the HAPPY case.
If neither of the above two conditions are met, set
    tbest = min(ti, tbest)
    and start a new measurement interval.
HAPPY case:
    tbest = min(ti, tbest)
    commitInterval = commitInterval * decreaseRatio
    and start a new measurement interval.
UNHAPPY case:
    Tbest = ti
    commitInterval = commitInterval * (1 + increaseRatio * (ceiling −
commitInterval) / (ceiling − floor) )
    and start a new measurement interval.
```

Examples of execution of the above pseudo code are next described.

In an example, the algorithm starts with the following values at some measurement interval.

```
minSampleCount = 5
Hysteresis = 4, serviceLatencyFrac = 0.5,
increaseRatio = 0.4, decreaseRatio = 0.8,
ceiling = 2000 milliseconds, floor = 1 millisecond,
unhappinessThreshold = 1.3.
commitInterval = 10 milliseconds
```

The store is responding very well, and suddenly gets slower, e.g., tbest=40 milliseconds, ti=80 milliseconds at the end of a measurement interval. In this case, (ti>1.3*tbest) evaluates to true, and the UNHAPPY case occurs. The following values are then set:

```
Tbest = 80 milliseconds
commitInterval = 10 * (1 + 0.4 * ( 2000 − 10) / (2000 − 1) )= 14
milliseconds
```

The commitInterval is now longer by a factor of about 1.4. This corresponds to backing off because the store is busy.

The store is responding moderately well, and suddenly gets faster, e.g., tbest=40 milliseconds, ti=30 milliseconds. The store performance additionally stayed at this new good level for a number of measurement intervals. In this case, (ti>1.3*tbest) consistently evaluates to false, and the HAPPY case is executed. The following values are then set:

```
Tbest = min(40,30) = 30 milliseconds
commitInterval = 10 * 0.8 = 8 milliseconds
```

The commitInterval is now shorter, which corresponds to being more aggressive at using the store because the store is underloaded.

Referring again to the first example above, suppose the commitInterval=500 milliseconds (e.g., the commitInterval was much slower to begin with). In this case, when the UNHAPPY state is entered, the following values are assigned.

---

Tbest = min(40,30) = 30 milliseconds
commitInterval = 500 * (1 + 0.4 * ( 2000 − 500) / (2000 − 1)) = 650 milliseconds

---

The commitInterval is longer by a factor of only 1.3. As in the first example, this corresponds to backing off because the store is busy. However, the increase of 1.3 is less than the earlier increase of 1.4. This illustrates the relatively slower store (the one with commitInterval=500) backing off more slowly than the faster store (the one with commitInterval=10). This slower relative backoff enables converging to fairness.

What is claimed is:

1. A system for managing dependencies among data operations in a cloud service by decoupling commit operations from write operations, said system comprising:
a memory area for storing a plurality of tracking objects, each of said tracking objects tracking one or more write or read operations, where a write operation effects a change in at least one data item stored by a computing device, each of said tracking objects having a key and a state associated therewith, said key identifying the tracking object, and said state indicating whether the change in the data item has been provided to the computing device and whether the change in the data item has been acknowledged by the computing device; and
a processor programmed to:
receive, from one or more application programs, a plurality of the operations in succession during a pre-defined interval;
alter the state of each of the tracking objects corresponding to the received plurality of operations to indicate, in each of the tracking objects, that the change in the data item has not been provided to the computing device;
for each of the tracking objects having the same key, commit to the computing device the change in the data item corresponding only to the write operation received last during the predefined interval, wherein the computing device stores the change in the data item; and
notify the application programs corresponding to the tracking objects of the committed change.

2. The system of claim 1, wherein the processor is further programmed to define a commit rate for committing the change in the data item.

3. The system of claim 1, wherein the processor is further programmed to receive a request for the data item from one of the application programs, said received request corresponding to at least one of the tracking objects stored in the memory area.

4. The system of claim 3, wherein the processor is further programmed to provide the requested data item to said one of the application programs if the state of said one of the tracking objects indicates that the change in the data item has been provided to the computing device and that the change in the data item has been acknowledged by the computing device.

5. The system of claim 1, wherein the processor is further programmed to alter the state of the tracking objects having the same key to indicate that the change in the data item has been provided to the computing device.

6. The system of claim 1, wherein the cloud service comprises a plurality of front-end servers, a plurality of middle tier servers, and a plurality of storage backend servers, and wherein the memory area and the processor are associated with one or more of the plurality of middle tier servers.

7. The system of claim 1, wherein the processor is further programmed to serialize each of the tracking objects having the altered state.

8. The system of claim 1, further comprising means for managing dependencies among data operations at a middle tier in a cloud service.

9. The system of claim 1, further comprising means for optimizing a latency of commit operations for the tracking objects by adjusting a commit rate differentially.

10. A method comprising:
accessing a plurality of tracking objects reflecting commit operations to be performed;
defining a commit rate for the plurality of commit operations;
providing the commit operations reflected by the accessed plurality of tracking objects to one or more computing devices in accordance with the defined commit rate;
measuring a latency associated with performance of one or more of the commit operations by the computing devices;
comparing the measured latency with a previously measured latency;
adjusting the defined commit rate based on said comparing; and
tuning the adjusted commit rate by a factor determined relative to the defined commit rate.

11. The method of claim 10, wherein adjusting the defined commit rate comprises:
accessing a maximum latency and a minimum latency; and
determining the factor based on the accessed maximum latency, the accessed minimum latency, and the defined commit rate.

12. The method of claim 11, wherein adjusting the defined commit rate comprises determining a commit interval, and wherein determining the factor comprises:

$$factor=1+ratio*(maximumLatency-commitInterval)/(maximumLatency-minimumLatency)$$

where ratio represents a default factor for adjusting the commit interval.

13. The method of claim 10, wherein measuring the latency comprises calculating an average latency of a plurality of the commit operations during a pre-defined interval.

14. The method of claim 10, wherein defining the latency comprises defining the latency for the commit operations to be acknowledged by the computing devices associated with a cloud service.

15. The method of claim 10, further comprising coalescing, prior to said providing, one or more write operations associated with the tracking objects such that only one of the write operations is provided to the computing devices.

16. The method of claim 10, further comprising batching one or more read or write operations associated with the tracking objects in a single communication to the computing devices.

17. The method of claim 10, further comprising receiving read or write operations from one or more application programs.

18. One or more computer-readable media having computer-executable components, said components comprising:

a persistence component for managing a commit rate of commit operations, said managing comprising adjusting the commit rate based in part on performance of the commit operations;

an interface component for accessing a plurality of tracking objects based on indications of read or write operations received in succession from application programs, each of said write operations corresponding to a change in at least one data item stored by one or more computing devices, each of said tracking objects having a state indicating whether the change in the data item has been provided to the computing devices and whether the change in the data item has been acknowledged by the computing devices; and a dependency component for altering, responsive to said accessing by the interface component, the state of the tracking objects corresponding to the received operations to indicate, in each of the tracking objects, that the change in the data item has not been provided to the computing device, said dependency component further combining the write operations corresponding to the same data item such that the dependency component provides the change in the data item from only a last received of the combined write operations to the computing devices at the commit rate managed by the persistence component.

19. The computer-readable media of claim 18, wherein the interface component comprises a storage proxy.

20. The computer-readable media of claim 18, wherein the persistence component executes on a plurality of middle tier servers in a computing cloud to adjust a commit rate of each of middle tier servers such that the commit rates of the middle tier servers converge over time.

* * * * *